United States Patent Office 2,915,381
Patented Dec. 1, 1959

2,915,381

PROCESS FOR REMOVING SULFUR AND OXYGEN FROM METALS

Dieter Goerrig, Lohmar, Siegkreis, and Viktor Lwowski, Leverkusen-Bayerwerk, Germany, assignors to Farbenfabriken Bayer Aktiengesellschaft, Leverkusen, Germany, a corporation of Germany No Drawing. Application March 6, 1958
Serial No. 719,480

Claims priority, application Germany March 7, 1957

11 Claims. (Cl. 75—55)

The present invention relates to a new and effective process for removing sulfur and oxygen from metals.

Many desulfurising and deoxidizing agents have been proposed, tested and used technically in many processes for removing sulfur to the highest possible degree from for example iron and for removing oxygen as completely as possible from a series of metals. The last traces of sulfide and oxide are soluble in the metal concerned and are always more difficult to reduce as the dilution progresses. Since, as a consequence of technical development, the purity standards as regards the sulfur and oxygen content of the metals are constantly raised, the effect so far produced with the known agents is unsatisfactory for many purposes.

In accordance with the invention it has been found that sulfur and oxygen are removed from metals in a simple manner by treating the metals to be purified in the liquid state with calcium monofluoride.

This invention makes it possible for the sulfur and oxygen content of metals to be reduced further than was possible by the conventional prior known processes, since calcium monofluoride constitutes a reducing agent having a very great affinity for sulfur and oxygen, which can be so easily handled that the use thereof does not require special techniques.

Calcium monofluoride can for example be obtained by reacting fluorspar with calcium at temperatures of 800° C. and higher, cf. Zeitschrift fuer anorganische Chemie, 47 (1905), 353/70, 354, 363/5, the same journal 61 (1909), 54/90, 81/90, and the same journal 78 (1912), 239/44.

It can also be obtained by electrolysis of fluorspar in diaphragm cells, calcium monofluoride being formed with fluorine split off; more preferably, calcium monofluoride can be prepared from mixtures of fluorspar and compounds such as CaO or $CaCl_2$, since the separation of CO (when using carbon anodes) or $Cl_2$ proceeds more readily.

Besides, carbon monofluoride may be produced by other processes wherein Ca is intermediately formed or might be formed in the presence of $CaF_2$ or by thermal reaction of mixtures of fluorspar and CaO by means of strong reducing agents, such as Al, $CaC_2$ or silicon.

Calcium monofluoride is a homogeneous non-metallic substance which is solid at room temperature, melts above 1300° C. and only develops a considerable vapour pressure at temperatures from about 1000 to about 1750° C., at which temperatures the purification of the metals is effected. This compound is so stable in air that it can be used in the solid and liquid state without special protective measures, for example placed in red hot ladles under steel tapping conditions, without being strongly oxidized or even burnt. Calcium monofluoride reacts with sulfides and oxides according to the equations:

$$2CaF + Me^{II}S \rightarrow Me^{II} + CaF_2 + CaS$$
$$CaF + Me^{II}O \rightarrow Me^{II} + CaF_2 + CaO$$

If the amount of CaF used is not sufficient for the complete reaction of sulfide and oxide at the same time, the sulfur is removed from the metal preferentially to the oxygen, but sulfur and also oxygen are removed when the molten metal is treated with excess CaF.

With the last-mentioned embodiment of the process according to the invention, it is possible in every case to lower the sulfur content of the metal to below the current limit of analytical detection. The same applies as regards the oxygen content in all metals and alloys which, like steels, the copper and the aluminium alloys, can be handled in the molten state in air; in the metals which, like titanium, may only be heated in vacuo or in a noble gas atmosphere to the melting temperature, it is true that a very small residue of oxygen is left which can still be detected analytically.

It is possible in accordance with the invention to employ products which deviate from the stoichiometry of CaF. Products of this kind are obtainable by cooling CaF melts containing either excess Ca or excess $CaF_2$.

If the calcium monofluoride is prepared technically from impure initial materials, it consists for example of only up to 80% of CaF; it has however been shown that the impurities consisting mainly of oxygen, carbon, hydrogen, silicon, aluminium and iron, do not in principle deleteriously affect the efficacy of this impure calcium monofluoride.

On the other hand, impurities may have a favorable effect. For example the lowering of the melting point as a result of impurities is of advantage for the removal of sulfur from pig iron, especially at relatively low temperatures (about 1200° C. or even lower temperatures). Moreover, impurities, especially $CaC_2$, lead to the reduction of the known tendency of CaF to disproportionation which, as a property of the calcium metal, brings about an increased loss by burning.

At the working temperatures of the steel melts, there is also obtained the particular advantage that both the reducing agent and the reaction products consisting of fluorides, oxides and sulfides, are thinly liquid, insoluble in the metal and of low density, and consequently quickly and completely enter the slag.

The compositions containing calcium monofluoride can be reacted with the metals under most simple conditions by placing them for instance in a tap ladle. Of course, the reaction may also be accomplished by other methods e.g. by mixing the reactants in a rotary drum or blowing the compositions containing calcium monofluoride into the molten metals by means of a gas stream (e.g. $H_2$, $N_2$, Ar); the latter methods are more complicated, but the consumption of the chemicals is lower.

The invention is further illustrated in the following examples without being restricted thereto.

*Example 1*

5 kg. of pig iron were melted in an induction furnace and superheated to 1500° C. The sulfur content was determined from a sample taken by means of a ladle. Thereupon, 100 g. of sintered calcium monofluoride were added and the mixture was stirred with a graphite rod 5 times within 5 minutes. After the fifth minute another sample was taken to determine the final sulfur content. Analyses showed: original sulfur content: 0.094% S; corresponding sulfur content after treatment: 0.0165% S, corresponding to a decrease in sulfur content of 82.4%.

*Example 2*

5 kg. of pig iron, superheated to 1600° C., were treated with 100 g. of molten calcium monofluoride under the conditions of the preceding example. Analyses showed: original sulfur content: 0.086% S; final sulfur content sulfdr content: 0.0955% S; final sdlfur content after in sulfur content of 85.4%.

*Example 3*

5 kg. of pig iron, superheated to 1700° C., were treated with 100 g. of sintered calcium monofluoride under the conditions of Example 1. Analyses showed: original sulfur content: 0.0955% C; final sulfur content after treatment: 0.007% S, corresponding to a decrease in sulfur content of 92.7%.

*Example 4*

5 kg. of pig iron, superheated to 1750° C., were treated with 150 g. of molten calcium monofluoride under the conditions of Example 1. Analyses showed original sulfur content: 0.083% S, any final sulfur content was no longer detectable after treatment.

*Example 5*

300 kg. of molten calcium monofluoride were added to 25 tons of pig iron while being run into the tap ladle. Analyses showed: original sulfur content: 0.070% S; final sulfur content after treatment: 0.022% S, corresponding to a decrease in sulfur content of 68.5%.

*Example 6*

300 kg. of molten calcium monofluoride were added to 30 tons of pig iron while being run into the tap ladle. Analyses showed: original sulfur content: 0.025% S; final sulfur content after treatment: 0.008% S, corresponding to a decrease in sulfur content of 68%.

*Example 7*

5 kg. of nickel, superheated to 1550° C., were treated with 100 g. of molten calcium monofluoride under the conditions of the preceding example. Analyses showed: original sulfur content: 0.048% S; final sulfur content after treatment: 0.008% S.

We claim:

1. In a process for the removal of sulfur and oxygen from metals, the step which comprises treating the metal to be purified in the liquid state with calcium monofluoride.

2. In a process for the removal of sulfur and oxygen from metals, the step which comprises treating the metal to be purified in the liquid state with calcium monofluoride in an amount as is at least chemically equivalent to the amount of sulfur and oxygen present in the metal to be purified.

3. Process as claimed in claim 1 in which the metal to be purified is pig iron.

4. Process as claimed in claim 2 in which the metal to be purified is pig iron.

5. A process according to claim 1, wherein the calcium fluoride is present in the amount of at least 80% in the form of calcium monofluoride containing one atom of calcium and one atom of fluoride.

6. A process according to claim 1 wherein said metal is pig iron containing up to 0.095% of sulfur and the amount of calcium monofluoride employed is 1.1–3% of the pig iron.

7. A process according to claim 1 wherein the amount of calcium monofluoride is insufficient to react simultaneously with the oxygen and the sulfur present in the metal to be purified, whereby the calcium monofluoride reacts with the sulfur preferentially, and the reaction with oxygen occurs only to the extent that said calcium monofluoride is present in excess of the amount required to react with sulfur.

8. A process according to claim 1, wherein said metal is nickel.

9. A process according to claim 1 wherein said molten metal is mixed with the molten calcium monofluoride in a rotary drum.

10. A process according to claim 1 wherein said molten calcium monofluoride is added to the pig iron while said pig iron is run into the tap ladle.

11. A process according to claim 1 wherein the calcium monofluoride is blown into the molten metal by means of an inert gas stream, said gas being a member selected from the group consisting of hydrogen, nitrogen and argon.

References Cited in the file of this patent

UNITED STATES PATENTS 2,173,205  Johannsen _____ Sept. 19, 1939

UNITED STATES PATENT OFFICE

CERTIFICATE OF CORRECTION

Patent No. 2,915,381                                      December 1, 1959

Dieter Goerrig et al.

It is hereby certified that error appears in the printed specification of the above numbered patent requiring correction and that the said Letters Patent should read as corrected below.

Column 1, line 72, in the second equation, for "CaF", first occurrence, read -- 2CaF --; column 2, line 67, Example 1, for "corresponding sulfur content" read -- final sulfur content --; column 3, line 4, Example 2, for "sulfdr content: 0.0955% S; final sdlfur content after" read -- after treatment: 0.0125% S corresponding to a decrease --; line 11, Example 3, for "0.0955% C;" read -- 0.0955% S; --.

Signed and sealed this 10th day of May 1960.

(SEAL)
Attest:

KARL H. AXLINE                                             ROBERT C. WATSON
Attesting Officer                                         Commissioner of Patents